Oct. 18, 1949.    R. STEVENSON    2,485,074
PRESSURE CONTROL
Filed June 17, 1946    2 Sheets-Sheet 1
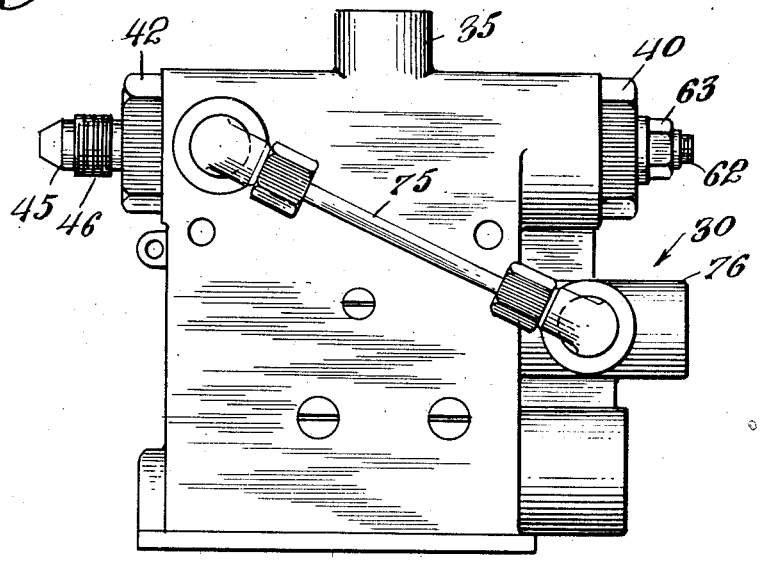
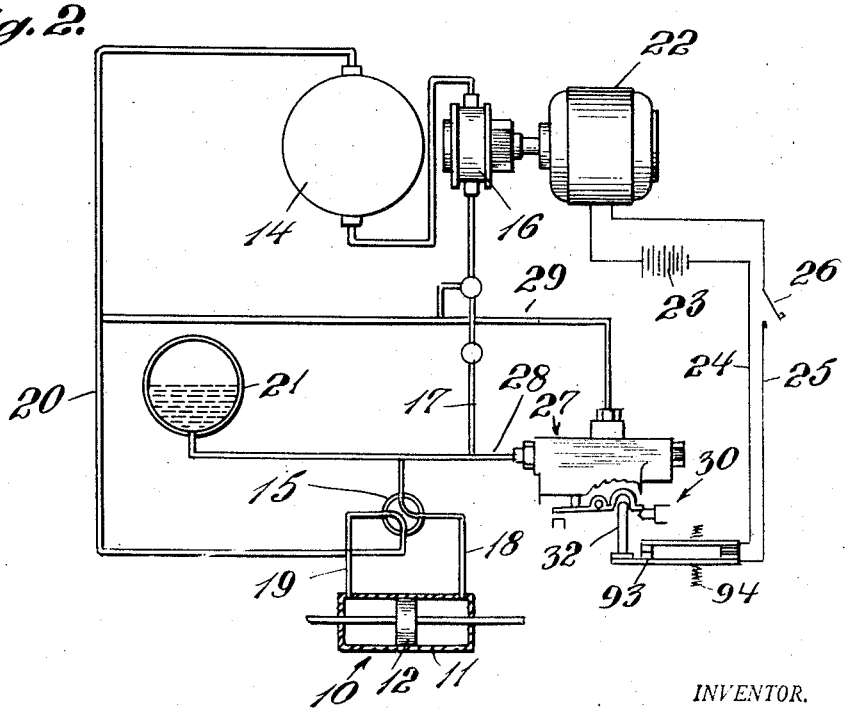
INVENTOR.
Robert Stevenson
BY
Barlow & Barlow
ATTORNEYS.

Oct. 18, 1949.   R. STEVENSON   2,485,074
PRESSURE CONTROL
Filed June 17, 1946   2 Sheets-Sheet 2
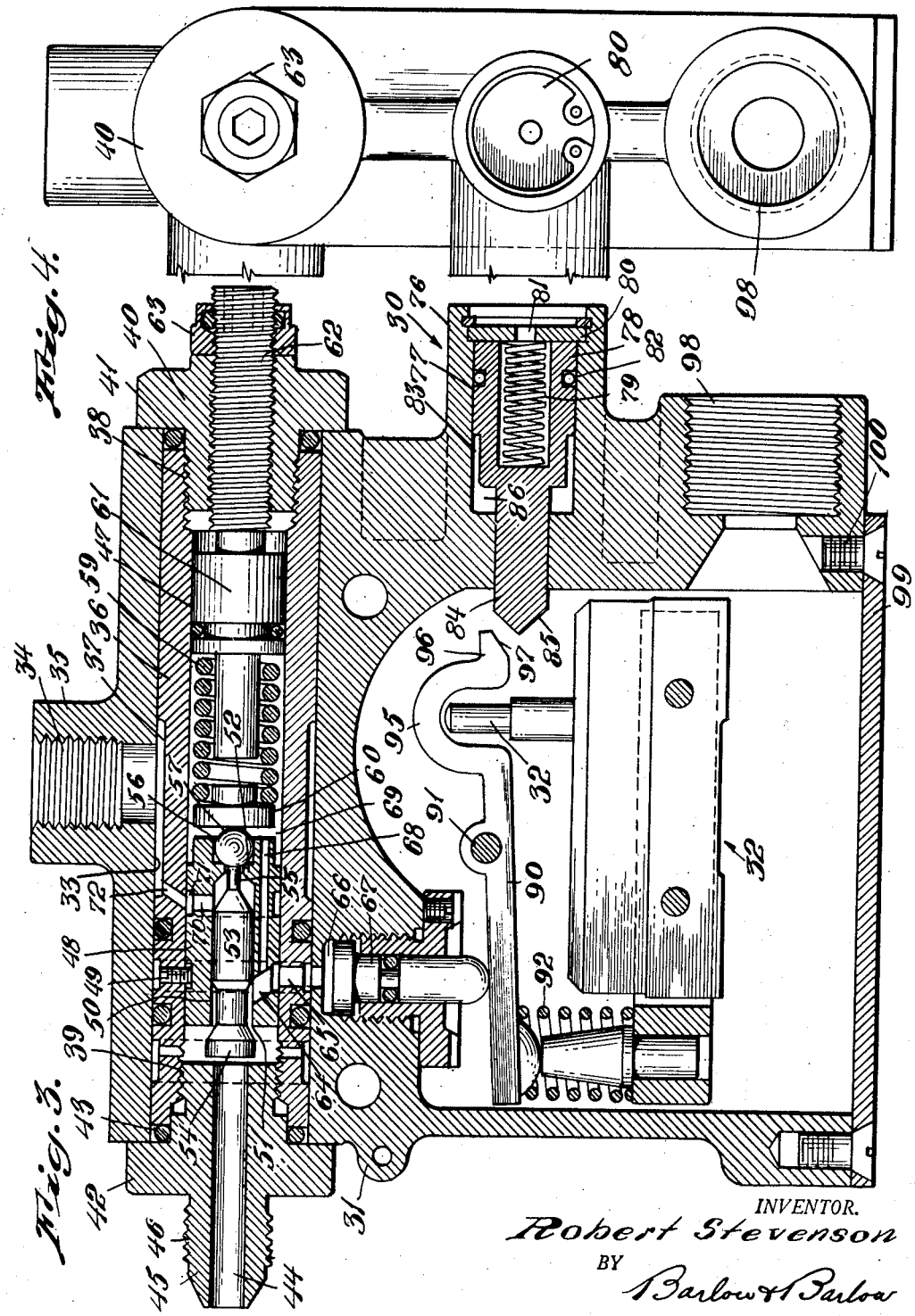
INVENTOR.
Robert Stevenson
BY
Barlow & Barlow
ATTORNEYS.

Patented Oct. 18, 1949

2,485,074

UNITED STATES PATENT OFFICE 2,485,074

PRESSURE CONTROL

Robert Stevenson, Barrington, R. I., assignor to Merit Engineering, Inc., a corporation of Rhode Island Application June 17, 1946, Serial No. 677,370

5 Claims. (Cl. 103—25)

This invention relates to a hydraulic system and more particularly to the pressure control in such system.

In the operating of a hydraulic system such as shown in my co-pending application, Ser. No. 553,198, which has a pump driven by an electric motor, the operation of the motor being controlled to maintain the pressure in the system between a certain high limit and a certain low limit, it is found that if the system is shut down and the pressure permitted to drop considerably below the low pressure limit such for example when a pressure exists in the system which will not operate the electric control for the motor then some manual manipulation is necessary in order to start the system from a low or zero pressure to a point where there will be sufficient pressure to actuate the switch for automatic operation of the system.

One of the objects of this invention is to provide a control which will automatically cause operation of the pump when zero pressure exists in the system such as when originally started up.

Another object of this invention is to provide an arrangement so that when pressure in the system gets below a point which would automatically be effective to operate a switch in the system then the pump will be operated to build up the pressure to a desired point so that the control for the high and low switches of the system may function.

Another object of this invention is to provide such an arrangement which will take over the control from the usual control mechanism but which will become inactive during the normal functioning of the mechanism.

Another object of the invention is to arrange so that the auxiliary control will only be effective at points during which it is desired the same shall take over control of the system.

With these and other objects in view, the invention consists of certain novel features of construction, as will be more fully described and particularly pointed out in the appended claims.

In the accompanying drawings:

Fig. 1 is an elevation of the control mechanism which is the subject of this invention.

Fig. 2 is a diagrammatic view illustrating the hook-up in which this control operates;

Fig. 3 is a central sectional view through the mechanism of Fig. 1; and

Fig. 4 is an end elevation of the structure of Fig. 3.

In proceeding with this invention, the normal control for the high and low pressure side of the system is arranged at a desired location so as to be affected by the high pressure side of the system while a return is provided to the low pressure side of the system. A switch is actuated by a mechanical mechanism operated by the pressure in the high pressure side of the system. In order to superimpose an auxiliary control on this usual control mechanism I provide a spring pressed plunger which will act to close a switch for operating the motor which operates the pump and then provide a conduit from a point in advance of the range control which will transmit pressure to the spring pressed plunger to hold it out of operation so long as the pressure in the system remains at a certain point to which the spring is adjusted and as soon as the pressure drops below this point then this spring will force the plunger in to close the switch which energizes the motor and drives the pump.

With reference to the drawings, the system in which this valve is used consists essentially of a work unit designated 10 and shown in Fig. 2, which comprises a cylinder 11 with a piston 12 therein to be moved in one direction or the other by hydraulic pressure. The supply reservoir is designated 14 from which liquid is drawn to be supplied to do the work required. A four-way control valve designated 15 is utilized for controlling the liquid and is supplied by a pump 16 to the conduit 17 leading to the valve 15 which in turn is supplied by either conduit 18 or 19 from the valve to the work cylinder 11. A return conduit 20 carries the low pressure liquid back to the reservoir 14. An expansion chamber 21 is connected in this supply line for smoother operation. An electric motor 22 drives the pump 16 from which energy is supplied by source 23 through wires 24 and 25. A hand operated main control shut off switch is designated 26. A main control mechanism 27 is connected to the supply line 17 as at 28 and has a return 29 to the low pressure side of the system. This control mechanism as will be pointed out in greater detail, serves to operate a switch to complete the energizing circuit to the motor 22 or to break this circuit so that the operation of the pump 16 may be controlled. The main control is designed to operate in substantially the manner pointed out in my prior application Ser. No. 553,198 but superimposed upon this main control is an auxiliary control designated generally 30 which assumes the control of the system when the pressure in the pressure line 17 drops below a predetermined value.

The main control unit comprises a block 31 which is recessed or hollowed out to receive a microswitch 32 having a plunger 32' which is urged outwardly of the casing and when in such position closes its contacts so as to complete a circuit through this switch. In the upper part of the block 31 there is a bore 33 which extends from one end to the other through the blocks. Leading from this bore there is an outlet passage 34 through a boss 35. This outlet passage 34 is threaded for connection to the conduit 29 which returns to the supply reservoir 14. A control is inserted into this bore 33 which is completely removable therefrom and is selfcontained. This control consists of a sleeve 36 of a size to substantially fit the bore and recessed as at 37 so as to provide a passage along a portion of the bore for purposes as will hereinafter appear. This sleeve 36 is internally threaded at its opposite ends as at 38 and 39 and a plug 40 engages the threads 38 and together with packing 41 provides a closure for this end of the bore and also a means for retaining the sleeve in position. Similarly a plug 42 engages threads 39 at the other end of the sleeve and is flanged so that together with the packing 43 it provides a closure for this end of the bore and a means for retaining the sleeve in position. If either one of these closures are removed the other may serve as a means to withdraw the sleeve from position.

The bore 44 through the closure 42 serves as a means of conducting the liquid under pressure into the bore 33. A boss 45 threaded as at 46 serves as a means for connecting the conduit 28 from the high pressure side of the system to this conduit 44. The sleeve 36 has an internal bore 47 in which there is positioned a block 48 which is secured in position by a set screw 49. This block 48 is provided with a bore 50 which forms a valve seat 51 at one end and is restricted as at 52 at its other end. A valve 53 slidably engages the bore 50 and is provided with an enlarged head 54 which is tapered to engage the valve seat 51 while it is provided with a reduced end 55 to extend through the opening formed by the reduced passage 52. A recess 56 in the end of the block 48 slidably guides the ball valve 57 which engages the edge of the passage 52 to form a closure. A spring 59 acting through the headed plunger 60 which engages the ball valve 57 urges the ball to seated position. The spring acts against an abutment 61 which may be adjusted by means of threaded member 62 extending through the closure plug 40 and held in adjusted position by the check nut 63.

A conduit 64 leads from a point below the valve seat 51 to a conduit 65 through the sleeve 36 and communicates with a chamber 66 in which the plunger 67 has an exposed head to be urged by pressure in the chamber downwardly as illustrated in Fig. 3. The conduit 68 extends from the conduit 64 to the area of the bore 47 to the right of the plug 48 as shown in Fig. 3 which area is designated generally 69 so that the spring, ball, and plunger will be enveloped in the liquid present in this chamber 69.

A conduit 70 extends from the bore 50 adjacent the reduced portion of the right hand end of the valve 53 as shown in Fig. 3 to an annular chamber 71 from which there extends conduit 72 to the annulus produced by the reduced portion 37 which in turn connects to the discharge outlet 34.

The areas of the valve 53 are so arranged that pressure of a predetermined high value will act upon the valve 53 to move it to the right against the urging of a spring 59 so as to engage the valve seat 51 and prevent the influence of pressure beyond this point to the right. This closing movement will open the ball valve 57 so that any liquid in the chamber 69 may pass through the opening 52 thence through conduit 70, chamber 71, conduit 72, and reduced portion 37 and through discharge port 34 to return to the reservoir. This likewise drains the area about the plunger 67 through ports 65, 64, and 68 so that no pressure is applied to the plunger 67.

When pressure drops below a certain point, a spring 59 will force the ball valve 57 to closed position and at the same time open the valve 53 whereupon pressure will enter beneath the valve head 54 and its influence will be felt in conduits 54, 55, chamber 66 on plunger 67 and also will be felt through the conduits 68 and in chamber 69 where the parts are so proportioned that the pressure will assist in holding the ball valve 67 in closed position.

At a point in advance of the head of the valve 64, communication is established with a conduit 75 (see Fig. 1) which leads to and establishes connection to the auxiliary control means 30. This control means comprises a boss 76, having a bore 77 in which there is slidably provided a plunger 78 centrally recessed to receive the spring 79 which engages an abutment 80 at its outer end having an opening 81 so as to prevent the trapping of fluid. A packing 82 serves to establish a tight connection between the walls of the bore 77 and the plunger 78. The plunger is reduced as at 83 and further reduced to provide a stem 84 having a pointed end 85. These reduced portions establish a chamber 86 beneath the plunger with which chamber the conduit 75 establishes communication with the high pressure side of the system ahead of the valve head 54. The spring 79 is so set that when a pressure exists in the high pressure side of the system below a certain predetermined point such for instance as some point below the low part of the range of operation of the device, then the spring will force the plunger 78 to the left as shown in Fig. 3 whereas when the pressure builds up or is above a certain predetermined point the plunger will be forced outwardly against the action of the spring.

In order to take advantage of the movements which are provided by the pressure in the liquid system, I have provided a lever 90 pivoted as at 91 in the recess provided in the block 31. A spring 92 serves to swing this lever about its pivot 91 and is of sufficient force to push the plunger 67 upwardly when a predetermined high pressure limit of the range of operation is reached. When this spring 92 does rock this end of the lever 90 upwardly, it forces the plunger 32 inwardly and opens the contacts 93 (see Fig. 2) which breaks the circuit 24, 25 to the motor 22. When pressure exists upon the plunger 67 sufficient to move it downwardly, then the lever 90 is rocked counterclockwise and the plunger 32 is permitted to move outwardly or upwardly under influence of spring 94 and thus the contacts are closed to establish circuit through lines 24 and 25 to the motor 22.

The lever 90 is arched upwardly as at 95 and is provided with an end 96 bevelled as at 97 which end is so positioned that it may be engaged by the pointed end 85 of the plunger 78. Should a pressure exist in the system which is lower than the range of operation and lower than will keep the plunger 78 out of action, then the spring 79 on the plunger 78 will force the same to the left as shown in Fig. 3 so that its pointed end 85 will engage the bevelled surface 97 and rock the lever counterclockwise and permit the plunger 32 to move outwardly and close the circuit. The lever cannot be rocked to push the plunger 32 to open the circuit until pressure is established in the system. The leads 24 and 25 may extend through opening 98 to the recess in which the microswitch 32 is located may be closed by a cover 99 having holding screws 100.

By this arrangement the range control of the device is similar to the range control in my previous patent application, Ser. No. 553,198 but in addition to this previous structure, I have provided in this application the auxiliary control 30 which takes over the operation of the system when a predetermined low pressure has been reached in the system, all automatically and without the necessity of manual manipulation. By this arrangement even though the entire device is stopped for a while it is unnecessary to exercise any manual manipulation for starting it again as was necessary when zero or close to zero pressure existed in the system in the prior arrangement which I have above referred to in the previously filed application.

I claim:

1. In a hydraulic system having pressure and return liquid conduits, a pump for effecting pressure in said pressure conduit, an electric motor for driving said pump, a supply of electric energy for said motor including a switch for controlling said supply, main control means responsive to the pressure level in said pressure conduit for operating said switch to drive said motor at a predetermined low level and stop said motor at a predetermined high level, auxiliary means communicating with the high pressure side of said control means for taking over control of said switch from said control means upon the pressure level dropping below a predetermined value lower than the above said lower level in said pressure conduit.

2. In a hydraulic system as set forth in claim 1 wherein said auxiliary means closes said switch and causes operation of said motor upon the predetermined lower pressure level being reached.

3. In a hydraulic system as set forth in claim 1 wherein said auxiliary means closes said switch and causes operation of said motor upon the predetermined lower pressure level being reached, and responds to withdraw its control of said main control means upon said pressure level rising to a predetermined value.

4. In a hydraulic system as set forth in claim 1 wherein said auxiliary means includes a plunger spring pressed in one direction to mechanically effect closure of said switch to operate said motor.

5. In a hydraulic system as set forth in claim 1 wherein said auxiliary means includes a plunger spring pressed in one direction to mechanically effect closure of said switch to operate said motor, said plunger being exposed to fluid pressure to move it in the opposite direction and maintain it at the opposite end of its stroke by said fluid pressure.

ROBERT STEVENSON.

REFERENCES CITED

The following references are of record in the file of this patent:

UNITED STATES PATENTS

| Number | Name | Date |
|---|---|---|
| 2,197,772 | Rockwell | Apr. 23, 1940 |
| 2,240,607 | Buck | May 6, 1941 |